(12) United States Patent
Yamasaki et al.

(10) Patent No.: US 7,641,798 B2
(45) Date of Patent: Jan. 5, 2010

(54) WASTE WATER TREATMENT METHOD AND WASTE WATER TREATMENT APPARATUS

(75) Inventors: Kazuyuki Yamasaki, Hiroshima (JP); Kazuyuki Sakata, Fukuyama (JP); Kazumi Chuhjoh, Takamatsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 468 days.

(21) Appl. No.: 11/524,314

(22) Filed: Sep. 21, 2006

(65) Prior Publication Data

US 2007/0068869 A1 Mar. 29, 2007

(30) Foreign Application Priority Data

Sep. 28, 2005 (JP) .............................. 2005-281648

(51) Int. Cl.
*C02F 3/00* (2006.01)
(52) U.S. Cl. ..................... 210/615; 210/620; 210/626; 210/627; 210/220
(58) Field of Classification Search ................. 210/615, 210/620, 626–627, 220
See application file for complete search history.

(56) References Cited

U.S. PATENT DOCUMENTS

| | | | | |
|---|---|---|---|---|
| 5,431,861 | A | * | 7/1995 | Nagahiro et al. ......... 261/140.1 |
| 5,798,091 | A | * | 8/1998 | Trevino et al. ............. 424/9.52 |
| 2003/0085172 | A1 | | 5/2003 | Yamasaki et al. |
| 2003/0132165 | A1 | * | 7/2003 | de Meulenaer et al. ...... 210/695 |
| 2004/0176649 | A1 | * | 9/2004 | Takahashi et al. ............. 585/15 |
| 2005/0258094 | A1 | | 11/2005 | Chiba |
| 2006/0191847 | A1 | | 8/2006 | Yamasaki et al. |
| 2007/0062869 | A1 | | 3/2007 | Yamasaki et al. |

FOREIGN PATENT DOCUMENTS

| | | |
|---|---|---|
| JP | 2003-136087 A | 5/2003 |
| JP | 2003-251384 A | 9/2003 |
| JP | 2003-334548 | 11/2003 |
| JP | 2004-50092 A | 2/2004 |
| JP | 2004-121962 | 4/2004 |
| JP | 2004-237144 A | 8/2004 |
| JP | 2004-321959 | 11/2004 |
| JP | 2007-75785 A | 3/2007 |
| JP | 3893396 B2 | 3/2007 |
| JP | 3893401 B1 | 3/2007 |
| JP | 2007-83108 A | 4/2007 |
| JP | 4029100 B2 | 1/2008 |
| JP | 4088630 B2 | 5/2008 |

* cited by examiner

*Primary Examiner*—Chester T Barry
(74) *Attorney, Agent, or Firm*—Nixon & Vanderhye P.C.

(57) ABSTRACT

A waster water treatment apparatus has micro-nano bubbles generation tanks, mixing tanks, a submerged membrane tank, a contact oxidation tank, and an activated charcoal adsorption device. In the micro-nano bubbles generation tanks, micro-nano bubbles are added to the waste water. In the mixing tanks, the waste water containing micro-nano bubbles is mixed with sludge containing microorganisms. In the contact oxidation tank, the waste water containing organofluoric compounds is microbially treated by the micro-nano bubbles added to the waste water. The micro-nano bubbles activate microorganisms in the waste water. Thereby organofluoric compounds are microbially decomposed with effect.

8 Claims, 8 Drawing Sheets

WASTE WATER TREATMENT METHOD AND WASTE WATER TREATMENT APPARATUS

CROSS-REFERENCE TO RELATED APPLICATIONS

This nonprovisional application claims priority under 35 U.S.C. §119(a) on Patent Application No. 2005-281648 filed in Japan on 28 Sep. 2005, the entire contents of which are incorporated herein by reference.

BACKGROUND OF THE INVENTION

The present invention relates to waste water treatment method and waste water treatment apparatus.

Organofluoric compounds and organochlorine compounds are chemically stable substances. The organofluoric compounds in particular are used for application such as surface-active agents since they have excellent properties in terms of heat resistance and chemical resistance.

However, it is difficult to microbially decomposite the organofluoric compounds or organochlorine compounds because they are chemically stable. Perfluorooctane sulfonic acid (PFOS) or perfluoro octanoic acid (PFOA), which is an example of the organofluoric compounds, is hardly decomposed in the ecosystem. This causes concern about harmful influence on the ecosystem. Thermal decomposition of PFOS or PFOA requires temperature as high as approx. 1000° C. since PFOS and PFOA are chemically stable. On the other hand, however, it is extremely difficult to decompose PFOS or PFOA in such a conventional treatment as to use microorganisms, photocatalysts or the like.

JP 2004-121962A discloses a conventional method and apparatus for using nanometer bubbles. In the method and apparatus for using nano bubbles, there have been utilized characteristics of nano bubbles such as an effect of surface activity or an effect of sterilization caused by decrease in buoyancy, increase in surface areas, intensification of surface activity, generation of a local high pressure field, and electrostatic polarization which appear in the nano bubbles. More specifically, it has been disclosed that mutual association of these characteristics makes it possible to lead to the adsorbing function of pollution components, the high speed cleaning function and the sterilization function of object surfaces, and thereby objects and/or waste-water are effectively cleaned under a low environmental load.

Also, JP 2003-334548A discloses a method for producing nano air-bubbles. The method for producing nano air-bubbles is composed of (i) a process for decomposing a part of liquid into gas in the liquid and (ii) a process for applying ultrasonic waves in the liquid, or (iii) a process for decomposing a part of liquid into gas and a process for applying ultrasonic waves.

Further, JP 2004-321959A discloses a waste liquid treatment apparatus. In the waste liquid treatment apparatus, ozone gas generated by an ozonizer and waste liquid drawn from the bottom of a treatment tank are fed to a micro bubble generator through a pressurization pump. The generated ozone micro bubbles are fed from openings of a gas blowout pipe into the waste liquid in the treatment tank.

However, the aforementioned JP 2004-121962A, JP 2003-334548A and JP 2004-321959A have following problems:

(1) It has not been disclosed that after micro-nano bubbles are added to treatment-receiving-water, the treatment-receiving-water containing micro-nano bubbles is introduced so that microorganisms are more activated. The term "micro-nano bubbles" herein refers to bubbles including both micro bubbles with a diameter of not more than 50 μm and not less than 1 μm and nano bubbles with a diameter of not more than 1 μm.

(2) It has not been disclosed that it is more effective in activating microorganisms than the case (1) that after micro-nano bubbles are added to treatment-receiving-water, the treatment-receiving-water and sludge containing microorganisms are mixed and introduced into a microbe tank.

(3) It has not been disclosed that after micro-nano bubbles are added to waste water containing organofluoric compounds or waste water containing organochlorine compounds, a first-stage microbial treatment is conducted, and then, after micro-nano bubbles are further added to the treatment-receiving-water, a second-stage microbial treatment is conducted to decomposite the above compounds.

As is stated above, there has not conventionally been known a method for decomposing the organofluoric compounds and the organochlorine compounds, which are chemically stable substances, reasonably at low costs.

BRIEF SUMMARY OF THE INVENTION

An object of the present invention is to provide waste water treatment method and apparatus capable of conducting effective microbial decomposing of organofluoric compounds or organochlorine.

To achieve the above-mentioned object, the present invention provides a waste water treatment method, comprising the steps of:

introducing waste water as treatment-receiving-water into a micro-nano bubble generation tank for adding micro-nano bubbles, which are micrometer and nanometer size bubbles, to the treatment-receiving-water; and then introducing the treatment-receiving-water containing the micro-nano bubbles into a microbe tank for applying microbial treatment to the treatment-receiving-water.

Since plenty of suspended substances are present in the microbe tank, it is generally impossible to sufficiently and/or efficiently generate micro-nano bubbles in the microbe tank. According to the present invention, however, after micro-nano bubbles are unfailingly added to waste water as treatment-receiving-water, the microbial treatment for the treatment-receiving-water is conducted in the microbe tank which has received the treatment-receiving-water. Therefore, microorganisms in the microbe tank are activated by micro-nano bubbles sufficiently added to the treatment-receiving-water. As the result, the activated microorganisms effectively decompose the organic compounds contained in the waste water.

The present invention also provides a waste water treatment method, comprising the steps of:

introducing waste water as treatment-receiving-water into a micro-nano bubble generation tank for adding micro-nano bubbles, which are micrometer and nanometer size bubbles, to the treatment-receiving-water;

introducing the treatment-receiving-water containing the micro-nano bubbles into a mixing tank for mixing the treatment-receiving-water with sludge containing microorganisms; and introducing the treatment-receiving-water mixed with the sludge into a microbe tank for applying microbial treatment to the treatment-receiving-water.

According to the invention, the waste water, which is introduced into the microbe tank as treatment-receiving-water, contains the sufficient micro-nano bubbles and the mixed sludge having microorganisms. The micro-nano bubbles directly act on the microorganisms to greatly activate them.

The present invention further provides a waste water treatment method, comprising the steps of:

introducing waste water as treatment-receiving-water into a first micro-nano bubble generation tank for adding micro-nano bubbles, which are micrometer and nanometer size bubbles, to the treatment-receiving-water;

introducing the treatment-receiving-water containing the micro-nano bubbles into a first microbe tank for applying first-stage microbial treatment to the treatment-receiving-water;

introducing the treatment-receiving-water, after application of the first-stage microbial treatment, into a second micro-nano bubble generation tank for adding the micro-nano bubbles to the treatment-receiving-water; and then introducing the treatment-receiving-water containing micro-nano bubbles into a second microbe tank for applying second-stage microbial treatment to the treatment-receiving-water.

According to the present invention, prior to the application of the second-stage microbial treatment, the micro-nano bubbles can be added to the treatment-receiving-water subjected to the first-stage microbial treatment. Thereby, it is possible to supplement micro-nano bubbles consumed in the first-stage microbial treatment prior to the application of the second-stage microbial treatment. As a result, the sufficient micro-nano bubbles can be added to the treatment-receiving-water not only in the first-stage microbial treatment but also in the second-stage microbial treatment, so that microorganisms in the second-stage microbial treatment can be further activated.

In one embodiment of the present invention, the waste water is waste water containing organofluoric compounds or organochlorine compounds.

According to this embodiment, the waste water containing organofluoric or organochlorine compounds, which have been generally difficult to decompose with microorganisms, can be treated in two stages with use of the activated microorganisms. This makes it possible to microbially decompose the organofluoric or organochlorine compounds with effect.

In one embodiment of the present invention, the first-stage microbial treatment is microbial treatment in a submerged membrane tank having a submerged membrane for filtration, and the second-stage microbial treatment is microbial treatment with use of charcoal in a contact oxidation tank provided with the charcoal.

According to this embodiment, for the first-stage microbial treatment, microbial treatment is conducted in the submerged membrane tank. The submerged membrane separates the microorganisms from the treatment-receiving-water which goes to the second micro-nano bubble generation tank. Consequently, it is possible to maintain high-concentration microorganisms and thereby to enhance the decomposing treatment efficiency by microorganisms. Further, for the second-stage microbial treatment, microbial treatment is conducted in the contact oxidation tank filled with charcoal. Thus, organic compounds in the waste water, which are adsorbed to the charcoal, can efficiently be decomposed by the microorganisms activated and propagated on the charcoal.

In one embodiment of the present invention, the waste water treatment method further comprises the step of introducing the treatment-receiving-water, after application of the second-stage microbial treatment, into a third micro-nano bubble generation tank for adding the micro-nano bubbles to the treatment-receiving-water; and then the step of introducing the treatment-receiving-water containing the micro-nano bubbles into an activated charcoal adsorption device for applying activated charcoal treatment to the treatment-receiving-water.

According to this embodiment, the treatment-receiving-water, which has received the second-stage microbial treatment, is subjected to the activated charcoal treatment in the activated charcoal adsorption device. The microorganisms contained in the treatment-receiving-water after reception of the second-stage microbial treatment can be activated on the surface of activated charcoal. Thus, the organic compounds in the waste water adsorbed to the activated charcoal can effectively be decomposed by the activated microorganisms propagated on the charcoal.

In one embodiment of the present invention, the organofluoric compounds in the waste water containing the organofluoric compounds are either perfluorooctane sulfonic acid or perfluoro octanoic acid.

According to this embodiment, perfluorooctane sulfonic acid and perfluoro octanoic acid, which have been hardly decomposed in a microbial way, can effectively be decomposed by microorganisms with small energy and without use of chemicals wherever possible.

In one embodiment of the present invention, the waste water treatment method further comprises the step of introducing the treatment-receiving-water containing the micro-nano bubbles, which comes from the first micro-nano bubble generation tank, into a mixing tank, while sludge is pumped up from a lower portion of the submerged membrane tank by an air lift pump and introducing the sludge into the mixing tank; and the step of mixing the treatment-receiving-water with the sludge in the mixing tank and introducing the treatment-receiving-water mixed with the sludge into the submerged membrane tank.

According to this embodiment, the sludge coming from the lower portion of the submerged membrane tank and the treatment-receiving-water containing the micro-nano bubbles are mixed in the mixing tank. Thereafter, the treatment-receiving-water is introduced into the submerged membrane tank. Therefore, plenty of the micro-nano bubbles can directly act on microorganisms in a short period of time, so that the microorganisms can be activated much more in a short period of time. Further, sludge is pumped up from the submerged membrane tank by an air lift pump. Therefore, the air lift pump makes it possible to transfer a large amount of the sludge in the submerged membrane tank to the mixing tank with small energy. Further, compared with the case of no mixing tank, the micro-nano bubbles can be spread throughout the submerged membrane tank.

In one embodiment of the present invention, when the micro-nano bubbles are added to the treatment-receiving-water in the third micro-nano bubble generation tank, ozone from an ozonizer is fed to the third micro-nano bubble generation tank for generating ozone micro-nano bubbles so as to add the ozone micro-nano bubbles to the treatment-receiving-water.

According to this embodiment, ozone micro-nano bubbles are added to the treatment-receiving-water in the third micro-nano bubble generation tank. Therefore, the ozone micro-nano bubbles, which are suspended in the treatment-receiving-water for a long period of time, decompose the organic compounds which have been hardly decomposed in the microbial way. This arises from powerful oxidative decomposition of ozone. Further, after the rigid organic compounds are oxidatively decomposed by ozone, the residual organic compounds are adsorption-treated by the activated charcoal in the activated charcoal adsorption device. In that case, the residual ozone can be also treated by the activated charcoal.

The present invention provides a waste water treatment apparatus, comprising:

a first micro-nano bubble generation tank receiving waste water, as treatment-receiving-water, introduced from outside and having a micro-nano bubble generator for generating micro-nano bubbles, which are micrometer and nanometer size bubbles, so as to add the micro-nano bubbles to the introduced treatment-receiving-water;

a submerged membrane tank for applying microbial treatment, with use of microorganisms propagating in sludge, to the treatment-receiving-water containing the micro-nano bubbles and for filtering the treatment-receiving-water with use of the submerged membrane;

a first mixing tank receiving the treatment-receiving-water containing micro-nano bubbles added in the first micro-nano bubble generation tank, and receiving the sludge having the microorganisms propagated in the submerged membrane tank for mixing the treatment-receiving-water with the sludge so as to introduce the treatment-receiving-water mixed with the sludge into the submerged membrane tank;

a second micro-nano bubble generation tank having a micro-nano bubble generator for generating the micro-nano bubbles so as to add the micro-nano bubbles to the treatment-receiving-water introduced from the submerged membrane tank;

a contact oxidation tank filled with charcoal for applying microbial treatment, with use of microorganisms propagated on the charcoal, to the treatment-receiving-water containing the micro-nano bubbles;

a second mixing tank receiving the treatment-receiving-water containing micro-nano bubbles added in the second micro-nano bubble generation tank, and receiving the sludge having microorganisms propagated in the contact oxidation tank for mixing the treatment-receiving-water with the sludge so as to introduce the treatment-receiving-water mixed with the sludge into the contact oxidation tank;

a third micro-nano bubble generation tank having a micro-nano bubble generator for generating the micro-nano bubbles so as to add the micro-nano bubbles to the treatment-receiving-water introduced from the contact oxidation tank; and an activated charcoal adsorption device receiving the treatment-receiving-water containing micro-nano bubbles added in the third micro-nano bubble generation tank, and filled with activated charcoal so as to apply microbial treatment, with use of microorganisms propagated on the activated charcoal, to the treatment-receiving-water.

According to the present invention, the microorganisms propagating in the submerged membrane tank, the contact oxidation tank and the activated charcoal adsorption device can be activated by micro-nano bubbles which are added in the first to third micro-nano bubble generation tanks respectively placed before the above-stated tanks and device. Thus, the activated microorganisms effectively decompose the organic compounds contained in the waste water in each of the submerged membrane tank, the contact oxidation tank and the activated charcoal adsorption device.

In one embodiment of the present invention, he submerged membrane tank is provided with a polyvinylidene chloride filling.

According to this embodiment, the activated microorganisms at high concentration are stably maintained in the polyvinylidene chloride filling.

As is clear from the above, according to the present invention, waste water i.e. treatment-receiving-water is introduced into the micro-nano bubble generation tank so as to sufficiently add micro-nano bubbles to the treatment-receiving-water, and then introduced into the microbe tank so as to apply microbial treatment to the treatment-receiving-water. The sufficient micro-nano bubbles added to the treatment-receiving-water make it possible to greatly activate microorganisms in the microbe tank, so that the activated microorganisms can effectively decompose organic compounds contained in the waste water in microbial manner.

Moreover, according to the waste water treatment method of the present invention, the treatment-receiving-water is introduced into the micro-nano bubble generation tank so as to add micro-nano bubbles to the treatment-receiving-water, introduced into the mixing tank so as to be mixed with sludge containing microorganisms, and introduced into the microbe tank so as to apply microbial treatment. Consequently, the treatment-receiving-water introduced into the microbe tank has the sufficient micro-nano bubbles and microorganisms contained in the sludge. Thus, sufficient the micro-nano bubbles directly act on the microorganisms in the treatment-receiving-water, so that the microorganisms are much more activated.

That is, according to the present invention, the activated microorganisms more effectively decompose the organic compounds contained in the waste water.

Further, according to the present invention, waste water as treatment-receiving-water is introduced into the first micro-nano bubble generation tank so as to add micro-nano bubbles to the water, then introduced into the first microbe tank to apply the first-stage microbial treatment to the water, and thereafter introduced into the second micro-nano bubble generation tank so as to add micro-nano bubbles to the water, before introduction of the water into the second microbe tank so as to apply the second-stage microbial treatment to the water. Consequently, before application of the second-stage microbial treatment, the micro-nano bubbles can be to the treatment-receiving-water after application of the first-stage microbial treatment. This makes it possible to supplement micro-nano bubbles consumed in the first-stage microbial treatment prior to the application of the second-stage microbial treatment. As a result, sufficient micro-nano bubbles can be added to the treatment-receiving-water both in the first-stage microbial treatment and in the second-stage microbial treatment.

That is, according to the present invention, the microorganisms in the first-stage microbial treatment and in the second-stage microbial treatment can be activated, so that the two-stage microbial treatment by the activated microorganisms can effectively decompose the organic compounds contained in the waste water.

Moreover, the waster water treatment apparatus according to the present invention treats waste water as treatment-receiving-water, which is introduced from the outside, sequentially by the first micro-nano bubble generation tank, the first mixing tank, the submerged membrane tank, the second micro-nano bubble generation tank, the second mixing tank, the contact oxidation tank, the third micro-nano bubble generation tank and the activated charcoal adsorption device, by which the microorganisms propagating in the submerged membrane tank, the contact oxidation tank and the activated charcoal adsorption device can sufficiently be activated by the micro-nano bubbles added in the first to third micro-nano bubble generation tanks placed prior to the respective tanks. Therefore, the activated microorganisms allow effective decomposition of the organic compounds contained in the waste water in each of the submerged membrane tank, the contact oxidation tank and the activated charcoal adsorption device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, the present invention will be described in detail in conjunction with embodiments with reference to the accompanying drawings.

FIRST EMBODIMENT

Figure 1:
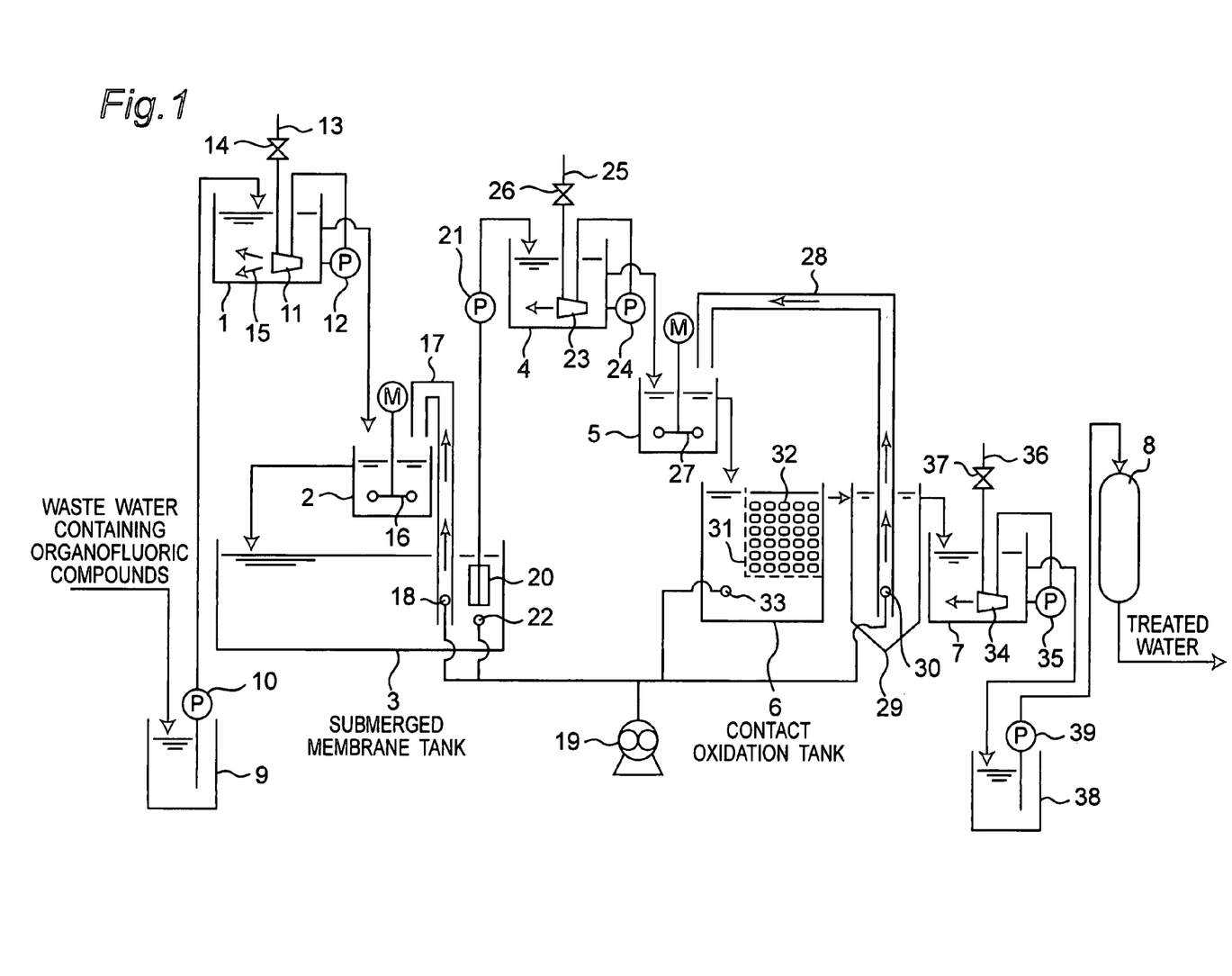
FIG. 1 is a block diagram showing a waster water treatment apparatus for treating waste water containing organofluoric compounds by a waste water treatment method according to the present invention.

FIG. 1 is a schematic block diagram showing a waster water treatment apparatus for treating waste water containing organofluoric compounds by a waste water treatment method according to the first embodiment of the present invention.

In this embodiment, the waste water containing organofluoric compounds are treated mainly in three stages as described below. In a first stage, the waster water is treated in a first micro-nano bubble generation tank 1, a first mixing tank 2, and a submerged membrane tank 3. In a second stage, the waste water is treated in a second micro-nano bubble generation tank 4, a second mixing tank 5 and a contact oxidation tank 6. In a third stage, the waste water is treated in a third micro-nano bubble generation tank 7 and an activated charcoal adsorption device 8.

Reference numeral 9 in FIG. 1 denotes a raw water tank, to which the waste water containing organofluoric compounds is introduced. The waste water containing organofluoric compounds, which have been introduced into the raw water tank 9, is introduced into the first micro-nano bubble generation tank 1 by a raw water pump 10.

Inside the first micro-nano bubble generation tank 1, a first micro-nano bubble generator 11 is placed. Outside the first micro-nano bubble generation tank 1, a circulating pump 12 is placed. Water in the first micro-nano bubble generation tank 1 is sucked by the circulating pump 12 to supply the water under increased pressure to the first micro-nano bubble generator 11. As a result, the first micro-nano bubble generator 11 generates micro-nano bubbles to produce a micro-nano bubble flow 15, while sucking air fed from an air suction pipe 13 connected thereto. The air suction pipe 13 is equipped with a valve 14 for adjusting the air amount in order to easily generate an optimum micro-nano bubble flow. Thus, the treatment-receiving-water having micro-nano bubbles added in the first micro-nano bubble generation tank 1 is next introduced into the first mixing tank 2.

The first mixing tank 2 has an agitator 16. Sludge containing microorganisms is transferred and introduced from the submerged membrane tank 3 into the first mixing tank 2 by an air lift pump 17. In the first mixing tank 2, the agitator 16 agitates and mixes the above-stated sludge and the treatment-receiving-water containing micro-nano bubbles coming from the first micro-nano bubble generation tank 1. An air diffuser pipe 18 is placed in the lower portion of the air lift pump 17 to discharge air from the air diffuser pipe 18, the air being fed from a blower 19.

The treatment-receiving-water, which contains micro-nano bubbles and biological sludge obtained in the first mixing tank 2, is next introduced into the submerged membrane tank 3. In this case, the micro-nano bubbles have a characteristic of being able to stay in water for a long period of time. Consequently, the micro-nano bubbles activate the microorganisms in the submerged membrane tank 3, so that the first-stage treatment of the organofluoric compounds is conducted by using the activated microorganisms.

Next, a submerged membrane pump 21 is operated, which is placed in the submerged membrane tank 3 and connected to a submerged membrane 20. Thereby, the treatment-receiving-water, which has permeated the submerged membrane 20, is introduced into the second micro-nano bubble generation tank 4. An air diffuser pipe 22 is placed below the submerged membrane 20. The air diffuser pipe 22 discharges air fed from the blower 19.

A second micro-nano bubble generator 23 is placed inside of the second micro-nano bubble generation tank 4, and a circulating pump 24 is placed outside thereof. The second micro-nano bubble generator 23 has an air suction pipe 25, wherein the suction air amount is adjustable by a valve 26.

The treatment-receiving-water, which contains micro-nano bubbles added in the second micro-nano bubble generation tank 4, is next introduced into the second mixing tank 5.

The second mixing tank 5 has an agitator 27. Sludge containing microorganisms is transferred from a settling tank 29 by an air lift pump 28 and introduced into the second mixing tank 5. In the second mixing tank 5, the agitator 27 agitates to mix the sludge and the treatment-receiving-water containing micro-nano bubbles coming from the second micro-nano bubble generation tank 4. An air diffuser pipe 30 is placed in the lower portion of the air lift pump 28. Air fed from the blower 19 is discharged from the air diffuser pipe 30.

Next, the treatment-receiving-water, which contains micro-nano bubbles and biological sludge obtained in the second mixing tank 5, is introduced into the contact oxidation tank 6. Because the micro-nano bubbles have a characteristic of being able to stay in water for a long period of time, the micro-nano bubbles can activate the microorganisms propagating on charcoal 32 filled in a net 31 of the contact oxidation tank 6. By using the activated microorganisms, the second-stage treatment is performed with respect to the organofluoric compounds. An air diffuser pipe 33, which is connected to the blower 19, is placed in the contact oxidation tank 6. The air discharged from the air diffuser pipe 33 aerates the inside of the contact oxidation tank 6 to maintain an aerobic environment.

After the second-stage treatment in the contact oxidation tank 6, the treatment-receiving-water overflows and is introduced into the settling tank 29. Then, the treatment-receiving-water in the settling tank 29 is introduced into the third micro-nano bubble generation tank 7.

A third micro-nano bubble generator 34 is placed inside of the third micro-nano bubble generation tank 7. A circulating pump 35 is placed outside thereof. The third micro-nano bubble generator 34 has an air suction pipe 36, wherein the suction air amount is adjustable by a valve 37.

The treatment-receiving-water, which contains micro-nano bubbles added in the third micro-nano bubble generation tank 7, is next introduced into a pit 38. The treatment-receiving-water, which is introduced into the pit 38, is further introduced into the activated charcoal adsorption device 8 by using an activated charcoal pit pump 39. In the activated charcoal adsorption device 8, the third-stage treatment for the organofluoric compounds is then performed with use of the microorganisms propagating on the activated charcoal and activated by the micro-nano bubbles.

As a result, it becomes possible to obtain treated water where the organofluoric compounds are effectively decomposed by microorganisms.

Any commercially available generator may be used for the first micro-nano bubble generator 11, the second micro-nano bubble generator 23 and the third micro-nano bubble generator 34. In the present embodiment, particularly, there are employed the generators made by Nanoplanet Research Institute Corporation. As other available products, on the other hand, there are a micro-nano bubble generator made by Aura Tec Corporation, a micro bubble water generating apparatus made by Seika Corporation and a micro bubble water generating apparatus made by Shigenkaihatsu Corporation, for example. From among these products, generators may be selected in accordance with the intended use.

Description is now given of three kinds of bubbles: normal bubbles, micro bubbles and nano bubbles. Normal bubbles ascend in water, and burst with a pop to disappear upon reaching the surface. Micro bubbles, which are microscopic bubbles with a diameter of not more than 50 μm and not less than 1 μm, shrink in water and eventually disappear (totally dissolved). Nano bubbles, which are microscopic bubbles smaller than the micro bubbles (with a diameter of not more than 1 μm: 100 nm to 200 nm), exist in water everlastingly. The micro-nano bubbles are mixture bubbles of the micro bubbles and the nano bubbles.

Thus, in the present embodiment, micro-nano bubbles are added to waste water containing organofluoric compounds by the first micro-nano bubble generation tank 1, the second micro-nano bubble generation tank 4 and the third micro-nano bubble generation tank 7. Thereafter, for microbial treatment, the waste water is introduced into the microbial tanks which are composed of the first mixing tank 2, the submerged membrane tank 3, the second mixing tank 5, the contact oxidation tank 6 and the activated charcoal adsorption device 8.

Plenty of suspended substances are present in the microbe tank, and therefore it is impossible to generate sufficient micro-nano bubbles efficiently. Accordingly, treatment-receiving-water, to which micro-nano bubbles are added to contain sufficient micro-nano bubbles, is introduced into the microbial tanks, as mentioned above. Thereby, microorganisms in the microbial tank can be activated, so that organic compounds contained in the waste water are microbially decomposed with effect.

Further, since each of the micro-nano bubbles generation tanks 1, 4, 7 is provided separately from the respective microbial tanks, it becomes possible to check the generating state of micro-nano bubbles. Specifically, it is possible to check generation of optimum micro-nano bubbles with unassisted eyes when the amount of air suction is adjusted by the valves 14, 26, 37 of the air suction pipes 13, 25, 36 connected to the respective micro-nano bubble generators 11, 23, 34.

Moreover, microbial treatment for the first-stage treatment is conducted in the submerged membrane tank 3. The submerged membrane 20 in the submerged membrane tank 3 separates the microorganisms from the treatment-receiving-water which goes to the second micro-nano bubble generation tank 4, so that high-concentration microorganisms can be maintained in the submerged membrane tank 3 in order to enhance the efficiency of decomposition treatment with the microorganisms. Further, microbial treatment for the second-stage microbial treatment is conducted in the contact oxidation tank 6 wherein the net 31 is filled with charcoal 32. Consequently, it is possible to more efficiently decompose organofluoric compounds adsorbed to the charcoal 32 by using the activated microorganisms propagating on the charcoal 32. Further, microbial treatment for the third-stage treatment is conducted in the activated charcoal adsorption device 8. Consequently, the microorganisms contained in the treatment-receiving-water after the second-stage treatment are activated on the surface of the activated charcoal. Also, organic substances adsorbed to the activated charcoal are efficiently decomposed by the microorganisms propagating on the surface of the activated charcoal.

Moreover, the second micro-nano bubble generator 23 and the third micro-nano bubble generator 34 are placed respectively before the contact oxidation tank 6 for the second-stage treatment and before the activated charcoal adsorption device 8 for the third-stage treatment. Those placements make it possible to supplement micro-nano bubbles consumed in the first-stage treatment and the second-stage treatment. As a result, micro-nano bubbles are sufficiently added to the treatment-receiving-water both in the second-stage treatment and in the third-stage treatment, which makes it possible to sufficiently activate microorganisms in the contact oxidation tank 6 and in the activated charcoal adsorption device 8.

Moreover, the water containing micro-nano bubbles and the sludge containing microorganisms are mixed in the first mixing tank 2 and the second mixing tank 5. Therefore, the effect of the micro-nano bubbles directly influences microorganisms to activate the microorganisms much more.

SECOND EMBODIMENT

Figure 2:
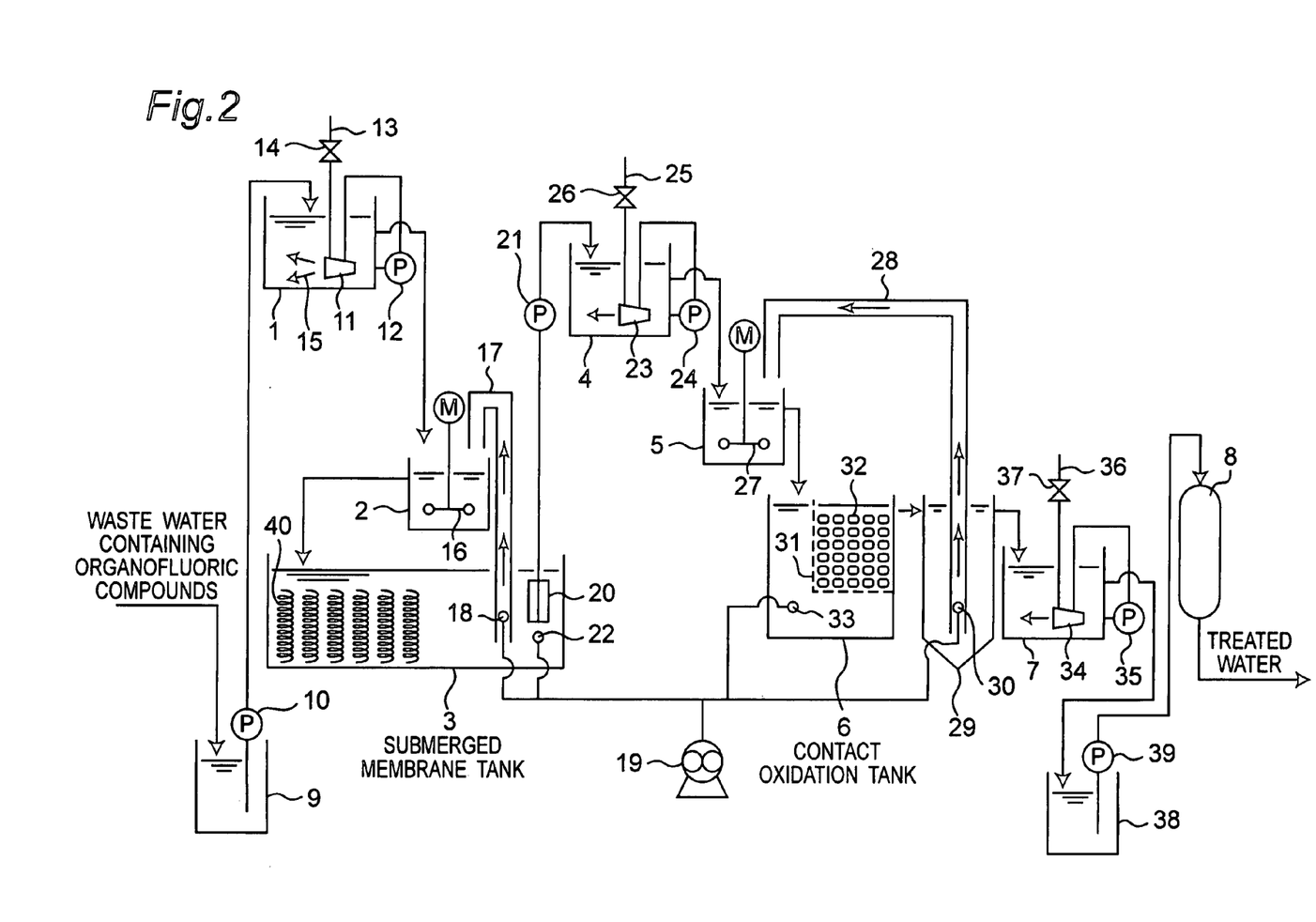
FIG. 2 is a block diagram showing a waster water treatment apparatus different from that in FIG. 1.

FIG. 2 is a schematic block diagram showing a waster water treatment apparatus in the second embodiment. In this embodiment, a polyvinylidene chloride filling is provided in the submerged membrane tank 3 shown in FIG. 1 of the first embodiment.

In FIG. 2, the component members identical to those shown in FIG. 1 for the first embodiment are designated by identical reference numerals. The detailed description thereof will be omitted. Hereinbelow, description will be given of different points from the first embodiment.

In this embodiment, the polyvinylidene chloride filling 40 is provided in the submerged membrane tank 3 as mentioned just above, and therefore the polyvinylidene chloride filling 40 allows the microorganisms, which are activated by micro-nano bubbles, to stably propagate. This makes it possible to stabilize water quality at the outlet of the submerged membrane tank 3, more specifically, the submerged membrane pump 21.

Further, since the polyvinylidene chloride filling 40 is provided in the submerged membrane tank 3, treatment capability of the submerged membrane tank 3 is effectively enhanced.

THIRD EMBODIMENT

Figure 3:
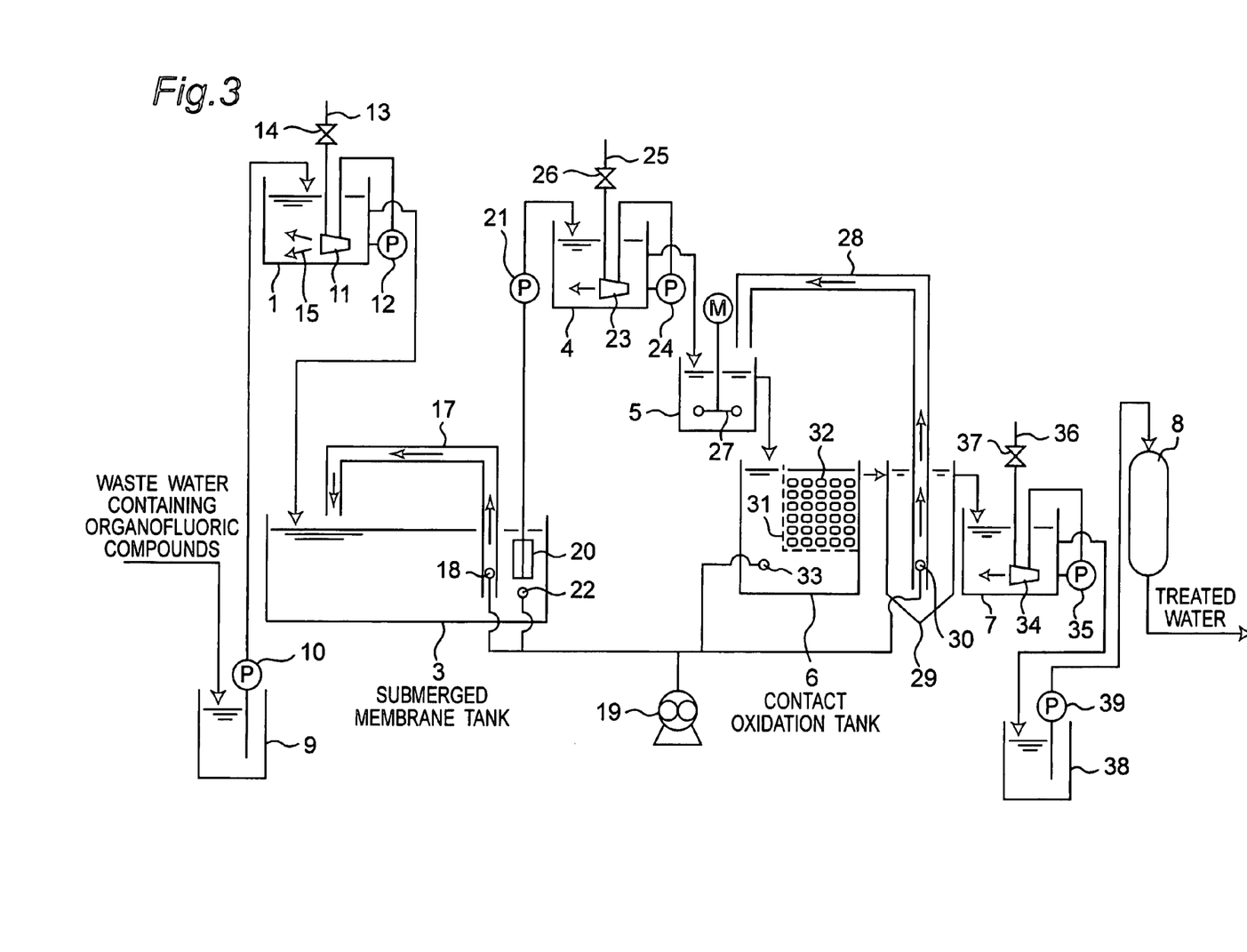
FIG. 3 is a block diagram showing a waster water treatment apparatus different from those in FIGS. 1 and 2.

FIG. 3 is a schematic block diagram showing a waster water treatment apparatus in the third embodiment. The first mixing tank 2, which is shown in FIG. 1 of the first embodiment, is removed in this embodiment.

In FIG. 3, the component members identical to those shown in FIG. 1 for the first embodiment are designated by identical reference numerals. The detailed description thereof will be omitted. Hereinbelow, description will be given of different points from the first embodiment.

In the present embodiment, the first mixing tank 2 of the first embodiment is removed. Therefore, the submerged membrane tank 3 provides a place where the micro-nano bubbles in treatment-receiving-water and the microorganisms in sludge transported by the air lift pump 17 come into contact each other. As a result, performance is slightly degraded in comparison with the first embodiment because of lack in the efficient contact between the micro-nano bubbles and the microorganisms in the first mixing tank 2.

However, the absence of the first mixing tank 2 reduces cost of production, which leads to reduction in initial cost totally.

FOURTH EMBODIMENT

Figure 4:
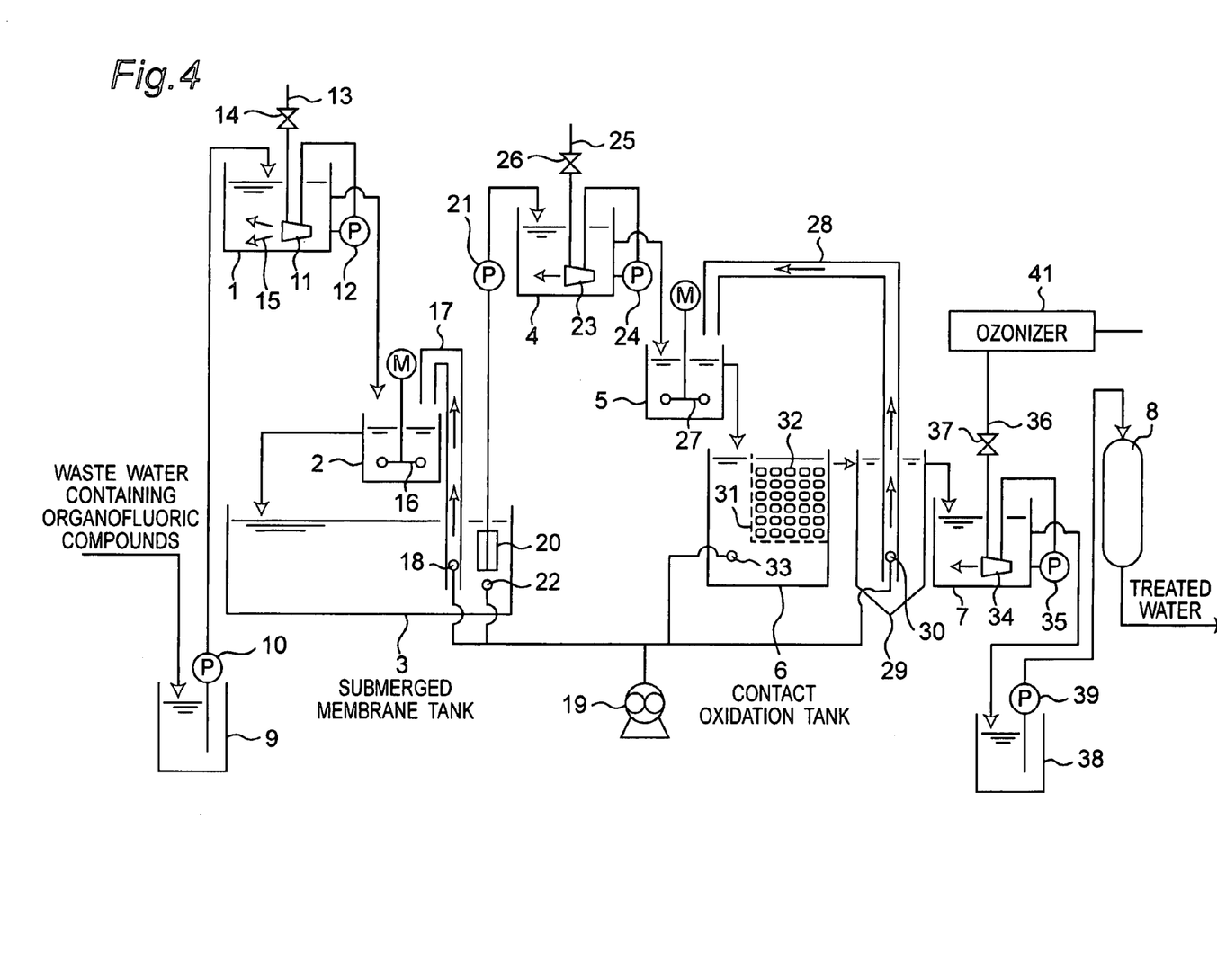
FIG. 4 is a block diagram showing a waster water treatment apparatus different from those in FIGS. 1 to 3.

FIG. 4 is a schematic block diagram showing a waster water treatment apparatus in the fourth embodiment. In this embodiment, an ozonizer 41 is connected to the air suction pipe 36 shown in FIG. 1 for the first embodiment.

In FIG. 4, the component members identical to those shown in FIG. 1 for the first embodiment are designated by identical reference numerals. The detailed description thereof will be omitted. Hereinbelow, description will be given of given of different points from the first embodiment.

In the present embodiment, the ozonizer 41, which is connected to the air suction pipe 36 used in the first embodiment as mentioned above, makes a change in micro-nano bubbles generated by the third micro-nano bubble generator 34 from conventional air micro-nano bubbles to ozone micro-nano bubbles. As a result, the micro-nano bubbles coming from the third micro-nano bubble generator 34 has increased oxidizability.

Thus, the treatment-receiving-water containing organofluoric compounds is oxidatively decomposed by strong oxidizability of the ozone. Thereafter, the treatment-receiving-water is introduced by the activated charcoal pit pump 39 into the activated charcoal adsorption device 8, where residual organofluoric compounds are treated by the adsorption capacity of the activated charcoal. However, since the ozone micro-nano bubbles are suspended in water for a long period of time, the ozone micro-nano bubbles enter into the activated charcoal adsorption device 8 to hinder propagation of microorganisms. As a result, in the activated charcoal adsorption device 8, the treatment is conducted only by the adsorption capacity of the activated charcoal, whereas decomposition treatment by microorganisms is not conducted.

FIFTH EMBODIMENT

Figure 5:
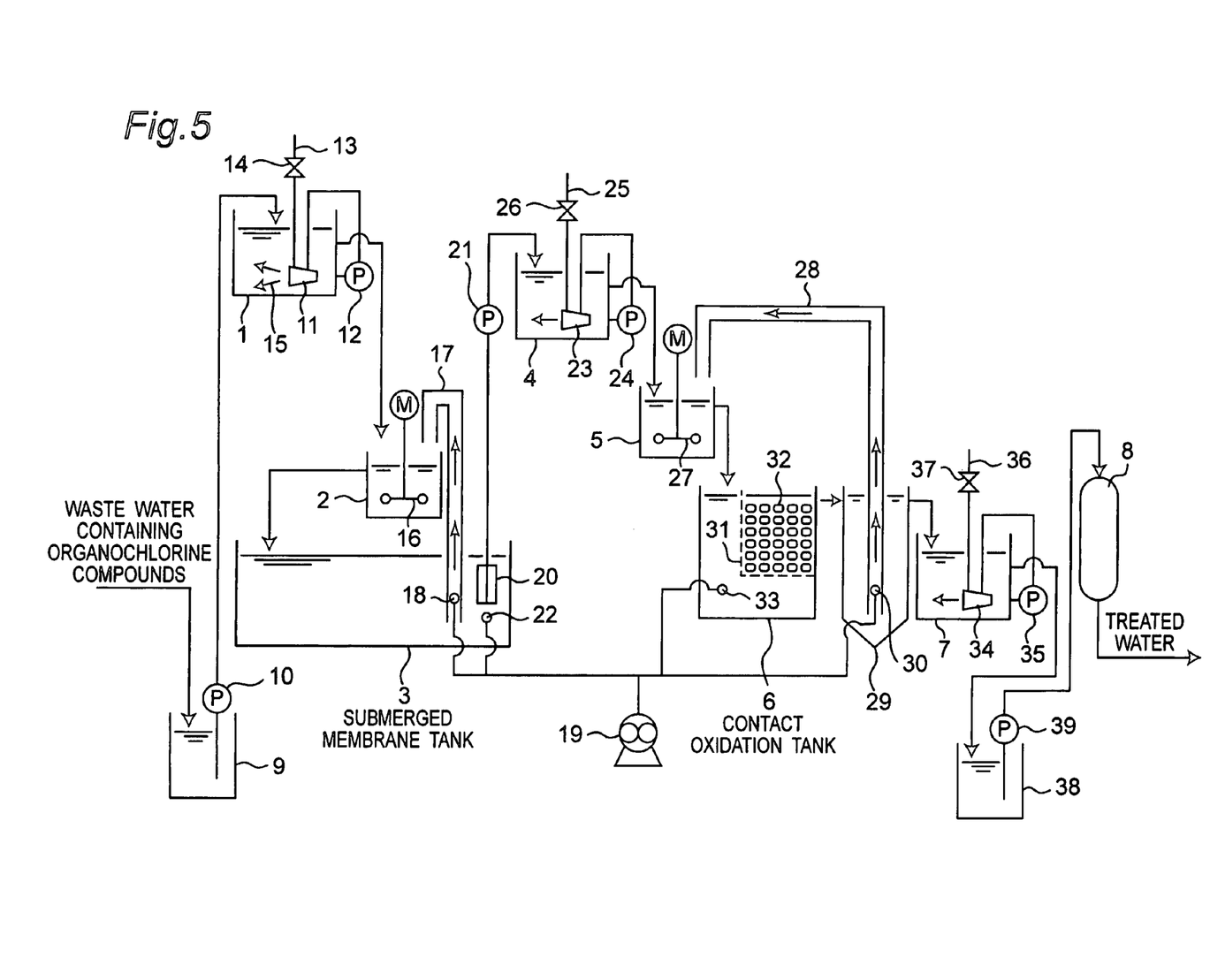
FIG. 5 is a block diagram showing a waster water treatment apparatus for treating waste water containing organochlorine compounds by a waste water treatment method according to the present invention.

FIG. 5 is a schematic block diagram showing a waster water treatment apparatus in the fifth embodiment. In this embodiment, the treatment-receiving-water is waste water containing organochlorine compounds, whereas the treatment-receiving-water shown in FIG. 1 for the first embodiment is waste water containing organofluoric compounds.

A structure of the waster water treatment apparatus in the present embodiment is quite identical to the structure of the waster water treatment apparatus shown in FIG. 1 for the first embodiment. Therefore, identical component members of the waster water treatment apparatus in the present embodiment are designated by identical reference numerals in the first embodiment, and the detailed description thereof will be omitted.

Not only the organofluoric compounds but also the organochlorine compounds are substances difficult to decompose microbially. However, the present embodiment has the structure of the waster water treatment apparatus identical to that in the first embodiment which can microbially decompose the organofluoric compounds with effect. According to the present embodiment, as in the case of the first embodiment, the organochlorine compounds can be effectively decomposed in the microbial manner.

SIXTH EMBODIMENT

Figure 6:
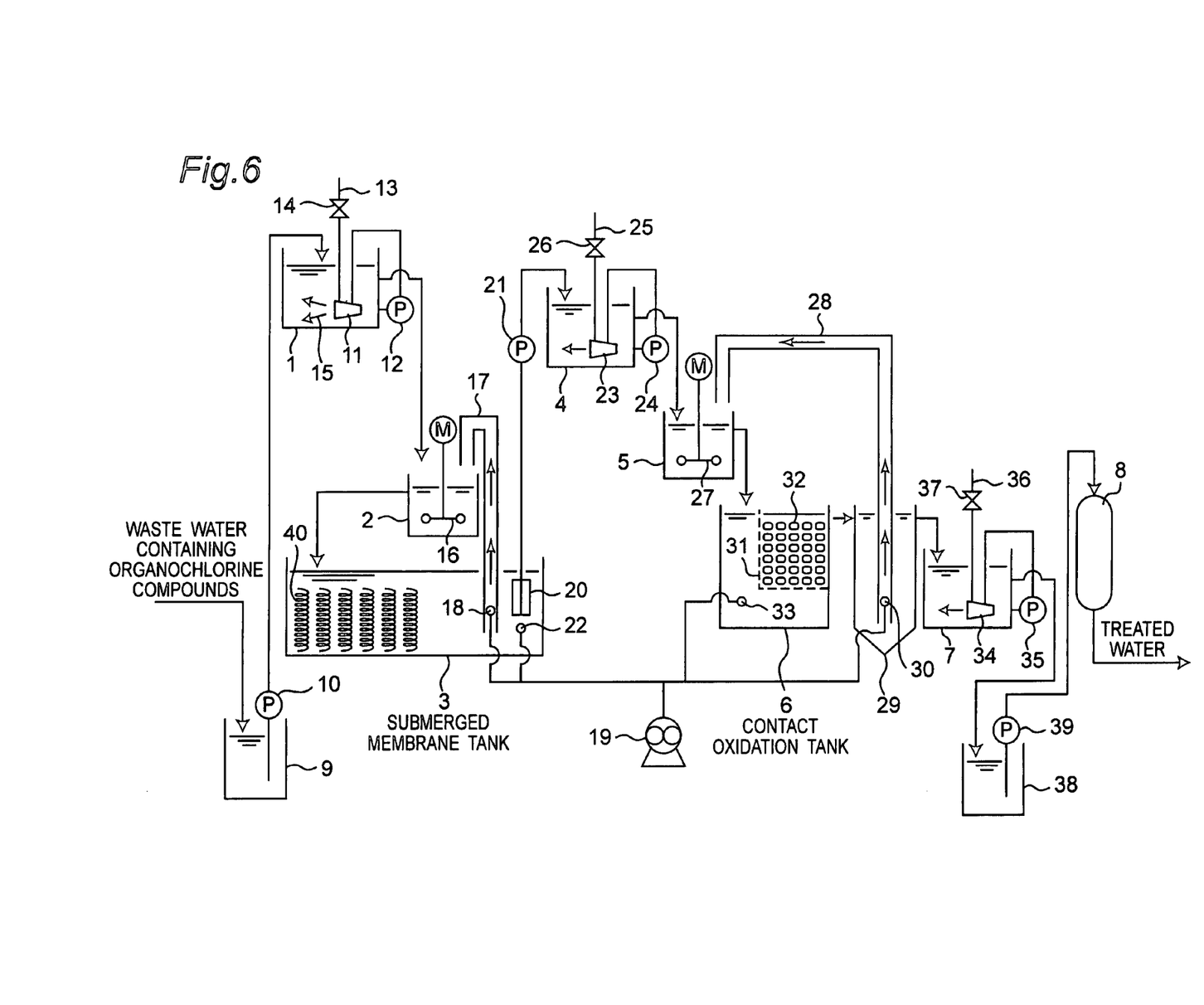
FIG. 6 is a block diagram showing a waster water treatment apparatus different from that in FIG. 5.

FIG. 6 is a schematic block diagram showing a waster water treatment apparatus in the sixth embodiment. This embodiment is different from the first embodiment shown in FIG. 1 in the points that a polyvinylidene chloride filling is provided in the submerged membrane tank 3 and that the treatment-receiving-water is waste water containing organochlorine compounds.

A structure of the waster water treatment apparatus in the present embodiment is identical to the structure of the waster water treatment apparatus in the second embodiment shown in FIG. 2. Accordingly, identical component members of the waster water treatment apparatus in the present embodiment are designated by identical reference numerals in the second embodiment. The detailed description thereof will be omitted.

In the present embodiment, as in the case of the second embodiment, the microorganisms activated by micro-nano bubbles can stably propagate in the polyvinylidene chloride filling 40. This makes it possible to stabilize water quality at the outlet of the submerged membrane tank 3, more specifically, water quality at the outlet of the submerged membrane pump 21. Further, there is also an effect of enhancing treatment capability of the submerged membrane tank 3.

SEVENTH EMBODIMENT

Figure 7:
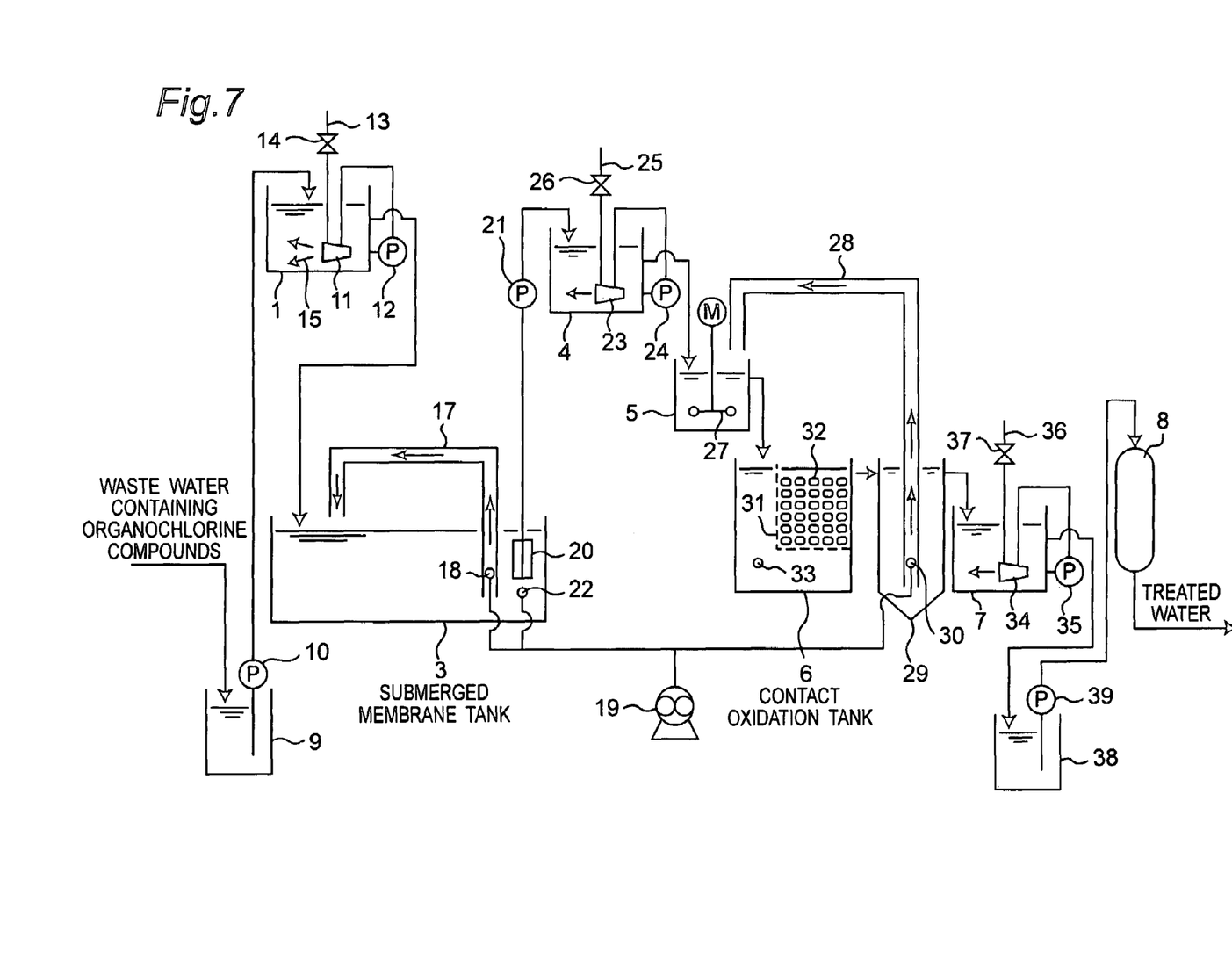
FIG. 7 is a block diagram showing a waster water treatment apparatus different from those in FIGS. 5 and 6.

FIG. 7 is a schematic block diagram showing a waster water treatment apparatus in the seventh embodiment. This embodiment is different from the first embodiment shown in FIG. 1 in the points that the first mixing tank 2 is removed and that the treatment-receiving-water is waste water containing organochlorine compounds.

The structure of the waster water treatment apparatus in the present embodiment is identical to the structure of the waster water treatment apparatus in the third embodiment shown in FIG. 3. Accordingly, identical component members of the waster water treatment apparatus in the present embodiment are designated by identical reference numerals in the third embodiment. The detailed description thereof will be omitted.

In the present embodiment, as in the case of the third embodiment, there is no efficient contact between the micro-nano bubbles and the microorganisms is absent in the first mixing tank 2. Therefore, performance of the apparatus is slightly degraded as compared with the fifth embodiment. However, the absence of the first mixing tank 2 can reduce cost of production, which leads to reduction in initial cost totally.

EIGHTH EMBODIMENT

Figure 8:
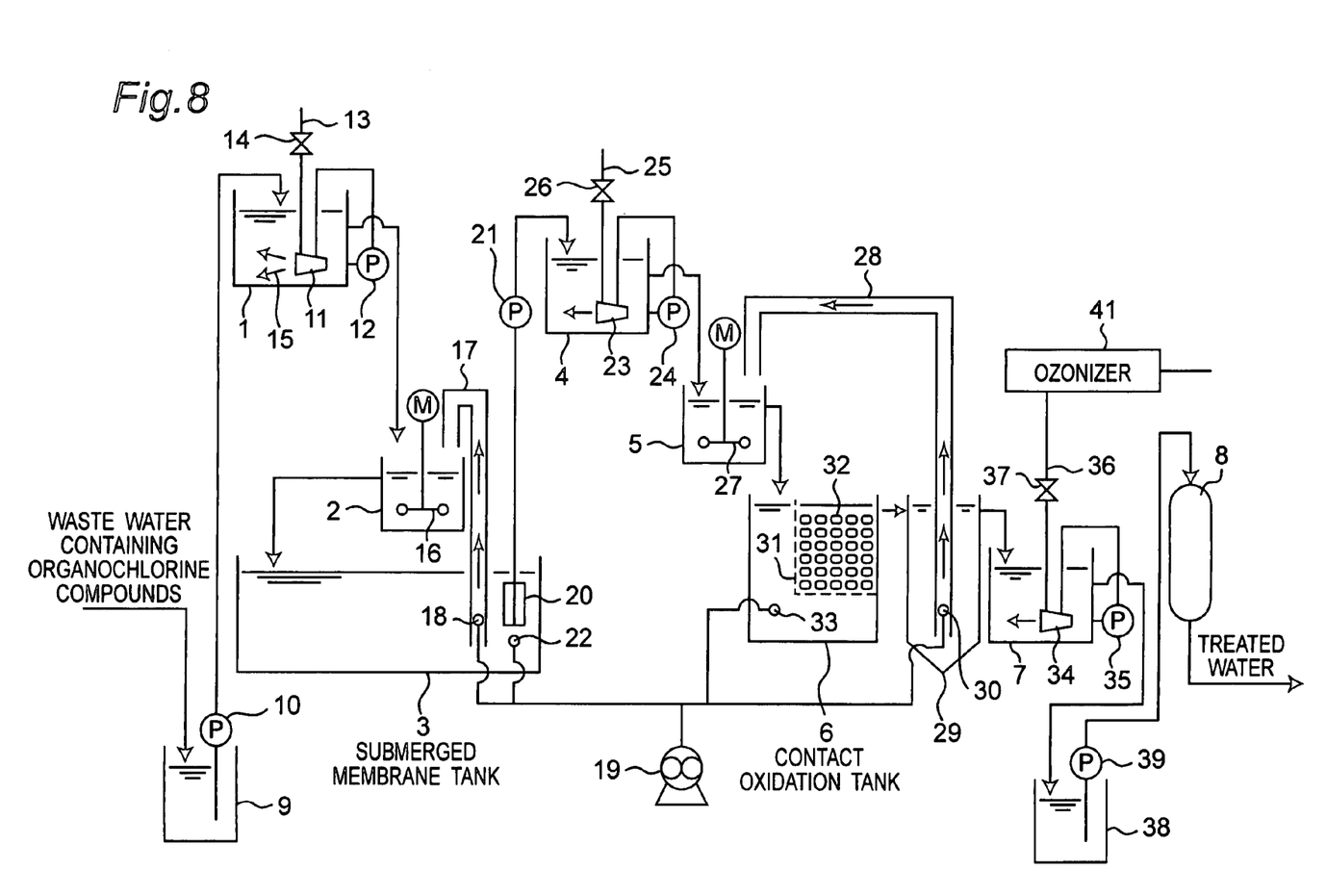
FIG. 8 is a block diagram showing a waster water treatment apparatus different from those in FIGS. 5 to 7.

FIG. 8 is a schematic block diagram showing a waster water treatment apparatus in the eighth embodiment. This embodiment is different from the first embodiment shown in FIG. 1 in the points that the air suction pipe 36 is connected to an ozonizer 41 and that the treatment-receiving-water is waste water containing organochlorine compounds.

The structure of the waster water treatment apparatus in the present embodiment is identical to the structure of the waster water treatment apparatus in the fourth embodiment shown in FIG. 4. Accordingly, identical component members of the waster water treatment apparatus in the present embodiment are designated by identical reference numerals in the fourth embodiment. The detailed description thereof will be omitted.

In the present embodiment, as in the case of the fourth embodiment, micro-nano bubbles generated by the third micro-nano bubble generator 34 are changed from conventional air micro-nano bubbles to ozone micro-nano bubbles. As a result, the micro-nano bubbles coming from the third micro-nano bubble generator 34 has increased oxidizability. Thus, the treatment-receiving-water containing organochlorine compounds is oxidatively decomposed by strong oxidizability of the ozone. Thereafter, the treatment-receiving-water is introduced by the activated charcoal pit pump 39 into the activated charcoal adsorption device 8, where residual organochlorine compounds are treated by the adsorption capacity of the activated charcoal.

EXPERIMENTAL EXAMPLE

Description is now given of an example of experiment in the first embodiment. Specifically, an experimental apparatus was manufactured based on the apparatus shown in FIG. 1. In the experimental apparatus, the capacity of the raw water tank 9 was 300 liters. The capacity of the first micro-nano bubble generation tank 1 was 20 liters. The capacity of the first mixing tank 2 was 10 liters. The capacity of the submerged membrane tank 3 was 1000 liters.

The capacity of the second micro-nano bubble generation tank 4 was 20 liters. The capacity of the second mixing tank 5 was 10 liters. The capacity of the contact oxidation tank 6 was 500 liters. The capacity of the settling tank 29 was 50 liters.

The capacity of the third micro-nano bubble generation tank 7 was 20 liters, the capacity of the pit 38 was 10 liters, and the capacity of the activated charcoal adsorption device 8 was 5 liters.

As the treatment-receiving-water, waste water containing organofluoric compounds from a semiconductor plant was introduced into the raw water tank 9. The measurement was conducted on the concentration of organofluoric compounds in the treatment-receiving-water (raw water) introduced into the raw water tank 9 and the concentration of organofluoric compounds in the treated water at the outlet of the activated charcoal adsorption device 8. The removal ratio of organofluoric compounds was 92% between the raw water and the treated water.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A waste water treatment method, comprising the steps of:

introducing waste water as treatment-receiving-water into a first micro-nano bubble generation tank for adding micro-nano bubbles, which are micrometer and nanometer size bubbles, to the treatment-receiving-water;

introducing the treatment-receiving-water containing the micro-nano bubbles into a first microbe tank for applying first-stage microbial treatment to the treatment-receiving-water;

introducing the treatment-receiving-water, after application of the first-stage microbial treatment, into a second micro-nano bubble generation tank for adding the micro-nano bubbles to the treatment-receiving-water; and then introducing the treatment-receiving-water containing micro-nano bubbles into a second microbe tank for applying second-stage microbial treatment to the treatment-receiving-waste, wherein the waste water is waste water containing organofluoric compounds or organochlorine compounds.

2. A waste water treatment method, comprising the steps of:

introducing waste water as treatment-receiving-water into a first micro-nano bubble generation tank for adding micro-nano bubbles, which are micrometer and nanometer size bubbles, to the treatment-receiving-water;

introducing the treatment-receiving-water containing the micro-nano bubbles into a first microbe tank for applying first-stage microbial treatment to the treatment-receiving-water;

introducing the treatment-receiving-water, after application of the first-stage microbial treatment, into a second micro-nano bubble generation tank for adding the micro-nano bubbles to the treatment-receiving-water; and then introducing the treatment-receiving-water containing micro-nano bubbles into a second microbe tank for applying second-stage microbial treatment to the treatment-receiving-waste, wherein the first-stage microbial treatment is microbial treatment in a submerged membrane tank having a submerged membrane for filtration, and the second-stage microbial treatment is microbial treatment with use of charcoal in a contact oxidation tank provided with the charcoal.

3. A waste water treatment method, comprising the steps of:

introducing waste water as treatment-receiving-water into a first micro-nano bubble generation tank for adding micro-nano bubbles, which are micrometer and nanometer size bubbles, to the treatment-receiving-water;

introducing the treatment-receiving-water containing the micro-nano bubbles into a first microbe tank for applying first-stage microbial treatment to the treatment-receiving-water;

introducing the treatment-receiving-water, after application of the first-stage microbial treatment, into a second micro-nano bubble generation tank for adding the micro-nano bubbles to the treatment-receiving-water; and then introducing the treatment-receiving-water containing micro-nano bubbles into a second microbe tank for applying second-stage microbial treatment to the treatment-receiving-waste, comprising the steps of:

introducing the treatment-receiving-water, after application of the second-stage microbial treatment, into a third micro-nano bubble generation tank for adding the micro-nano bubbles to the treatment-receiving-water; and then introducing the treatment-receiving-water containing the micro-nano bubbles into an activated charcoal adsorption device for applying activated charcoal treatment to the treatment-receiving-water.

4. The waste water treatment method according to claim 1, wherein the organofluoric compounds in the waste water containing the organofluoric compounds are either perfluorooctane sulfonic acid or perfluoro octanoic acid.

5. The waste water treatment method according to claim 2, comprising the steps of:

introducing the treatment-receiving-water containing the micro-nano bubbles which comes from the first micro-nano bubble generation tank into a mixing tank, while sludge is pumped up from a lower portion of the submerged membrane tank by an air lift pump and introducing the sludge into the mixing tank; and mixing the treatment-receiving-water with the sludge in the mixing tank and introducing the treatment-receiving-water mixed with the sludge into the submerged membrane tank.

6. The waste water treatment method according to claim 3, wherein when the micro-nano bubbles are added to the treatment-receiving-water in the third micro-nano bubble generation tank, ozone from an ozonizer is fed to the third micro-nano bubble generation tank for generating ozone micro-nano bubbles so as to add the ozone micro-nano bubbles to the treatment-receiving-water.

7. A waste water treatment apparatus, comprising:

a first micro-nano bubble generation tank receiving waste water, as treatment-receiving-water, introduced from outside and having a micro-nano bubble generator for generating micro-nano bubbles, which are micrometer and nanometer size bubbles, so as to add the micro-nano bubbles to the introduced treatment-receiving-water;

a submerged membrane tank for applying microbial treatment, with use of microorganisms propagating in sludge, to the treatment-receiving-water containing the micro-nano bubbles and for filtering the treatment-receiving-water with use of the submerged membrane;

a first mixing tank receiving the treatment-receiving-water containing micro-nano bubbles added in the first micro-nano bubble generation tank, and receiving the sludge having the microorganisms propagated in the submerged membrane tank for mixing the treatment-receiving-water with the sludge so as to introduce the treatment-receiving-water mixed with the sludge into the submerged membrane tank;

a second micro-nano bubble generation tank having a micro-nano bubble generator for generating the micro-nano bubbles so as to add the micro-nano bubbles to the treatment-receiving-water introduced from the submerged membrane tank;

a contact oxidation tank filled with charcoal for applying microbial treatment, with use of microorganisms propagated on the charcoal, to the treatment-receiving-water containing the micro-nano bubbles;

a second mixing tank receiving the treatment-receiving-water containing micro-nano bubbles added in the second micro-nano bubble generation tank, and receiving the sludge having microorganisms propagated in the contact oxidation tank for mixing the treatment-receiving-water with the sludge so as to introduce the treatment-receiving-water mixed with the sludge into the contact oxidation tank;

a third micro-nano bubble generation tank having a micro-nano bubble generator for generating the micro-nano bubbles so as to add the micro-nano bubbles to the treatment-receiving-water introduced from the contact oxidation tank; and an activated charcoal adsorption device receiving the treatment-receiving-water containing micro-nano bubbles added in the third micro-nano bubble generation tank, and filled with activated charcoal so as to apply microbial treatment, with use of microorganisms propagated on the activated charcoal, to the treatment-receiving-water.

8. The waste water treatment apparatus according to claim 7, wherein the submerged membrane tank is provided with a polyvinylidene chloride filling.

* * * * *